P. C. MOSIER.
Corn-Planter.
No. 19,198. Patented Jan. 26. 1858.
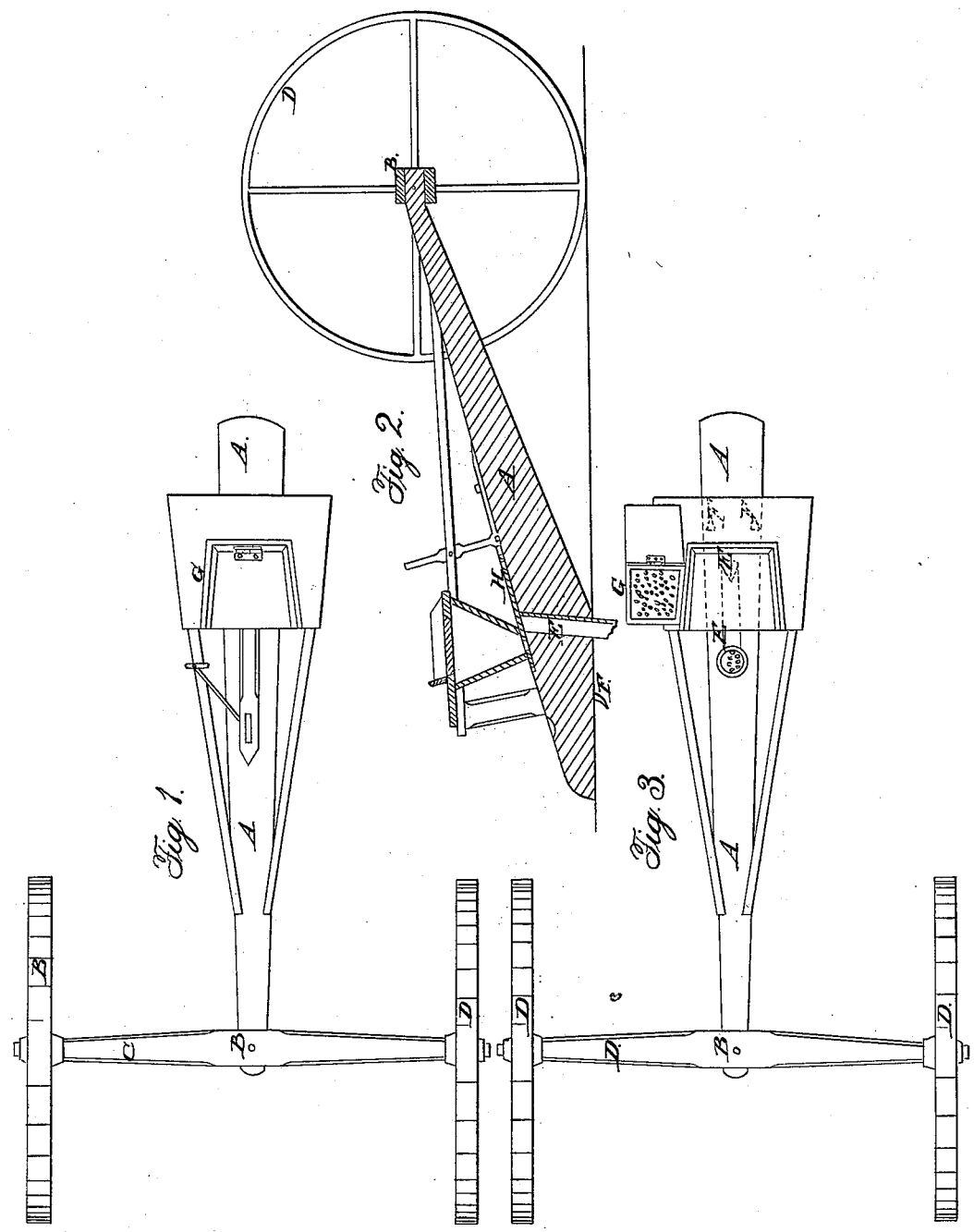

UNITED STATES PATENT OFFICE.

P. C. MOSIER, OF HOMER, ILLINOIS.

IMPROVEMENT IN CORN-PLANTERS.

Specification forming part of Letters Patent No. 19,198, dated January 26, 1858.

*To all whom it may concern:*

Be it known that I, P. C. MOSIER, of Homer, in the county of Champaign and State of Illinois, have invented a new and useful Improvement in Sod Corn-Planters; and I do hereby declare that the following is a full, clear, and exact description of the same, reference being had to the accompanying drawings, forming part of this specification, in which—

Figure 1 is a top view; Fig. 2, a vertical longitudinal section of a sod corn-planter constructed with my improvements, and Fig. 3 a top view of a modification of the same.

Similar letters of reference in each of the several figures indicate corresponding parts.

This invention is designed especially for opening and depositing seed into prairie sod or unplowed land; and the nature of my invention consists in pivoting the beam to the forward axle and having its rear end, which carries the tubular furrow-opener, covering-shares, seed-hopper, and driving-seat, run directly upon the ground, this arrangement allowing the beam or front axle perfect freedom of action laterally in the path of a circle independently of one another, and renders the weight of the operator available for forcing the furrow-opener into the soil, and also places the discharge of the seed under the immediate control of the operator.

To enable others skilled in the art to make and use my invention, I will proceed to describe its construction and operation.

A represents the beam, made narrow at its front end and broad at its rear end. The beam is shaped in such a manner that its broad rear portion runs horizontally upon the ground, while its narrow front portion inclines upward above the ground and attaches by means of a pivot, B, to an axle, C, which has two wheels, D D, arranged on its ends.

E is the tubular V-shaped furrow-opener. It passes up through the beam, as shown in Figs. 2 and 3.

F F are covering-shares placed to one side and in rear of E.

G is a hopper mounted just above the furrow-opener, as in Figs. 1 and 2, or in line with it, but on one side of the beam, as in Fig. 3. This hopper, when arranged as in Figs. 1 and 2, has its top constructed so as to serve as the driver's seat, but not so as when arranged in the position shown in Fig. 3.

H is a seed-distributing slide. It is arranged and operated in the ordinary manner. This slide may be used when the hopper is over the furrow-opener; but, instead of it, I prefer to use the hand for gaging and dropping the seed when the hopper is arranged to one side of the furrow-opener, as in Fig. 3.

This implement is exceedingly simple, and from its peculiar arrangement the weight of the driver and beam are rendered available for forcing and retaining the furrow-opener in the unplowed or sod soil, and at the same time every facility is afforded for turning the machine and for the wheels to yield in and turn the path of a circle to any obstruction without jolting or materially affecting the driver, beam, or furrow-opener.

What I claim as my invention, and desire to secure by Letters Patent, is—

The beam A, when shaped as specified and pivoted to the axle C by its forward end and has its rear end, which carries the tubular furrow-opener, covering-shares, seed-hopper, and driver's seat, arranged to run directly upon the ground, substantially as and for the purposes herein set forth.

P. C. MOSIER.

Witnesses:
GEORGE MOSIER,
R. C. WRIGHT.